United States Patent [19]
Noguchi et al.

[11] Patent Number: 6,105,150
[45] Date of Patent: Aug. 15, 2000

[54] ERROR INFORMATION COLLECTING METHOD AND APPARATUS

[75] Inventors: Mayumi Noguchi; Fumio Shimada; Tetsuya Shinboku, all of Kawasaki, Japan

[73] Assignee: Fujitsu Limited, Kawasaki, Japan

[21] Appl. No.: 09/048,023

[22] Filed: Mar. 26, 1998

[30] Foreign Application Priority Data

Oct. 14, 1997 [JP] Japan ..................................... 9-280872

[51] Int. Cl.⁷ ............................. H02H 3/05; G11C 29/00
[52] U.S. Cl. ................................ 714/44; 714/45; 714/723
[58] Field of Search .................................. 714/47, 48, 46, 714/25, 42, 31, 723, 718, 44

[56] References Cited

U.S. PATENT DOCUMENTS

| | | | |
|---|---|---|---|
| 5,495,573 | 2/1996 | Datwyler et al. | 395/185.01 |
| 5,515,384 | 5/1996 | Horton, III | 371/22.4 |
| 5,617,531 | 4/1997 | Crouch et al. | 395/183.06 |
| 5,696,769 | 12/1997 | Choi et al. | 371/30 |
| 5,720,031 | 2/1998 | Lindsay | 395/183.18 |

*Primary Examiner*—Norman M. Wright
*Attorney, Agent, or Firm*—Staas & Halsey, LLP

[57] ABSTRACT

A CPU in a computer includes a control information management table for storing information about whether an error has occurred in a control unit in the computer or in a control unit in a communications card. When an error occurs in any of the control units, the occurrence of the error is recorded in the control information management table, and an error message is transmitted by the monitor to an operator. When a dump collection command is issued by the operator in response to the error message, the monitor specifies the CPU in the computer or the communications card which operates the control unit where the error has occurred, by referring to the control information management table, and collects only the dump information corresponding to the control unit.

22 Claims, 13 Drawing Sheets

```
┌─────────────────────────────────────────────────────────────────┐
│ S5321 ERROR DETECTED IN COMMUNICATION CONTROL FIRMWARE          │
│    ABNORMALITY DETECTED IN COMMUNICATIONS CONTROL FRAME         │
│ SUPPLEMENTAL INFORMATION: LINK NAME, LINE NAME [NODE NAME], ERROR│
│                           OCCURRENCE POINT, ERROR CONTENTS, COMMAND CODE │
│                           [CSW] [SENSE] [ERROR DETAILS]         │
└─────────────────────────────────────────────────────────────────┘
```
⇐ (a) DISPLAYED PORTION

| | | |
|---|---|---|
| SOURCE | : | SC \| LIN \| LINK NAME |
| MESSAGE LEVEL | : | C |
| CAUSE | : | ABNORMALITY OF FIRMWARE FOR CONTROLLING COMMUNICATIONS HAS BEEN DETECTED |
| USER PROCESS | : | CONTACT SE. FOR DETAILS, REFER TO EXPLANATION OF CONTENTS OF ERROR OF S5500 |
| SYSTEM PROCESS | : | SETTING CORRESPONDING LINK IN INOPERABLE STATE |

⇐ (b) PORTION DESCRIBED IN MANUAL, ETC.

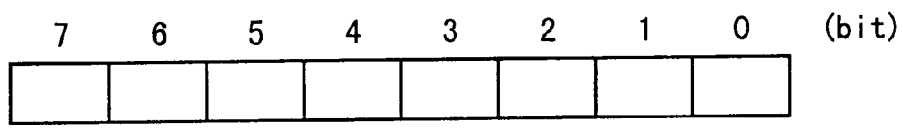
bit7: FLAG IS SET WHEN ABNORMALITY IS DETECTED IN 106
bit6: FLAG IS SET WHEN ABNORMALITY IS DETECTED IN 102
bit3: FLAG IS SET WHEN ABNORMALITY IS DETECTED IN 107
bit2: FLAG IS SET WHEN ABNORMALITY IS DETECTED IN 108
bit1: FLAG IS SET WHEN ABNORMALITY IS DETECTED IN 109
bit0: FLAG IS SET WHEN ABNORMALITY IS DETECTED IN 110
F I G.   2

```
(a) DISPLAYED PORTION

S5325 DCE (MODEM ETC.) ERROR
  ABNORMALITY OCCURRED IN DCE (MODEM, ETC.)
  SUPPLEMENTAL INFORMATION:  LINK NAME, LINE NAME [NODE NAME], ERROR
                             OCCURRENCE POINT, ERROR CONTENTS, COMMAND CODE
                             [CSW] [SENSE] [ERROR DETAILS]
```

(b) PORTION DESCRIBED IN MANUAL, ETC.

```
SOURCE          :  SC | LIN | LINK NAME
MESSAGE LEVEL   :  C
CAUSE           :  ABNORMALITY OCCURRED IN DCE (MODEM, NCU, DSU,
                   CABLE, ETC.)
USER PROCESS    :  CONFIRMING CONNECTION STATE OF DCE.  CONFIRMING
                   SETTING OF DCE.  CONTACT CE.  FOR DETAILS, REFER
                   TO EXPLANATION OF CONTENTS OF ERROR OF S5500
SYSTEM PROCESS  :  SETTING CORRESPONDING LINK IN INOPERABLE STATE
```

FIG. 11

(a) DISPLAYED PORTION (b) PORTION DESCRIBED IN MANUAL, ETC.

S5378 NOT CONTINUED COMMUNICATION CONTROL FIRMWARE ERROR
ERROR OCCURRED AND MADE COMMUNICATIONS CONTROL FIRMWARE INOPERABLE
SUPPLEMENTAL INFORMATION: LINK NAME, LINE NAME [NODE NAME], ERROR OCCURRENCE POINT, ERROR CONTENTS, COMMAND CODE [CSW] [SENSE] [ERROR DETAILS]

SOURCE          : SC | LIN | LINK NAME
MESSAGE LEVEL   : C
CAUSE           : INCONSISTENCY DETECTED IN CONTENTS OF DRIVER
USER PROCESS    : CONTACT CE OR SE
SYSTEM PROCESS  : SETTING CORRESPONDING LINK IN INOPERABLE STATE

FIG. 12

ERROR INFORMATION COLLECTING METHOD AND APPARATUS

BACKGROUND OF THE INVENTION

1. Field of the Invention

The present invention relates to a technology of collecting error information (dump information) when an error occurs in a computer system having a CPU in the computer and various process cards.

2. Description of the Related Art

In a computer system having a CPU in a computer (main board, etc.) and various process cards, the configuration of a device control function performed as firmware, a program, etc. in the CPU in the computer and in the process cards, may depend on the performance requested to a system.

That is, specific device control functions are performed by the CPU of a computer or through process cards depending on the functions requested to the system.

In this case, if an error (or an abnormality) occurs in any device control function, or if the device control function abnormally terminates, then the device control function or a function of controlling the device control function detects the error, and an error message is transmitted to a display device, etc. through a monitor routine (or an operating system). When a common user receives the error message, he or she normally requests a system engineer or an operator to remove an error condition.

According to the error message received, the operator is normally able to specify a cause of an error by collecting the operation conditions of the device control function when the error occurred. Practically, the operator collects dump information, which is an execution image in a memory space of the device control function, by issuing a dump collection command to a monitor routine, and sequentially analyzes the contents. When a dump collection command is issued, it is normally necessary to specify a target of a dump collection, that is, a CPU in a computer, the computer means body of the computer apparatus which any process card is provided for or inserted to, or any process card according to the above described example.

The error message received normally contains the type (name, etc.) of the device control function in which an error has occurred, the contents of the error, the address at which the error has occurred, etc. However, the message does not contain information as to whether the device control function in which the error has occurred is performed by the CPU in the computer or by any of the process cards.

Therefore, the operator conventionally determines whether the device control function in which the error has occurred is performed by the CPU in the computer or by any of the process cards, according to the limited information provided by an error message, the descriptions in a manual, specification, etc., and based on the operator's experience only, issues a dump collection command to the determined CPU of a computer or a process card, and has to extract the portion corresponding to the device control function from the collected dump information.

However, since identification of the portion where the device control function performed when an error occurs and extraction of the corresponding portion need experience, these processes cannot be performed by all users. Therefore, the above described conventional technology has the problem that operators are limited to those who can analyze and restore a system from an error.

It is not reasonable for the following grounds to include in a transmitted error message the information about the position where the device control function should be performed.

First, an error detection routine becomes complicated when the routine is assigned the function of transmitting the information about the position where the corresponding device control function should be performed, thereby over-utilizing the system resources and lowering the system performance.

Second, even if an error message contains information about the position where the corresponding device control function should be performed, one of a plurality of dump collection commands should be selected depending on whether the target of dump collection is a CPU in a computer or various process cards. As a result, an experienced operator is required to collect appropriate dump data. If an inexperienced operator collects dump data, to prevent the operator from collecting the inappropriate dump information or insufficiency dump information, it is necessary to collect all dump information after all.

If a common user, etc. can collect dump information according to a simple command correctly corresponding to the device control function in which an error has occurred, then an experienced operator is not necessarily required to be dispatched, by transmitting or transferring, for example, the collected dump information to a support center. However, for the above described grounds, it is conventionally difficult to appropriately specify a process card or a CPU in a computer by which a device control function is performed, and to collect only the dump information appropriately corresponding to the device control function.

SUMMARY OF THE INVENTION

The present invention has been developed based on the above described background, and aims at automatically specifying a CPU in a computer or a process card in which the device control function is performed when an error has occurred only by issuing a simple dump collection command in response to an error message. The present invention also aims at collecting only dump information appropriately corresponding to the device control function.

The present invention is based on the method of collecting error information when an error occurs in a computer system containing a processor device in a computer (CPU 101, 401 in a computer) and a process card (communications card 102, 402).

The first aspect of the present invention has the following configuration.

First, the processor device in a computer or the process card is provided with a control information management table (control information management table 111) for storing data as to whether an error has occurred in a device control unit in a processor device in a computer or in a device control unit in a process card.

Next, when an error occurs in a processor device in a computer or in a device control unit in a process card, it is stored in the control information management table.

Then, an error message corresponding to the error is displayed.

When an error information collection command is issued in response to the error message, a processor device in a computer or a process card which operates a device control unit, in which the error has occurred, is specified by referring to the control information table. Thus, error information corresponding only to the device control unit can be successfully collected.

With the configuration according to the first aspect of the present invention, the operator only issues a simple error information collection command in response to the error message to automatically specify a processor device in a computer or a process card which operates a device control unit, in which the error has occurred, by referring to the control information table. Thus, error information corresponding only to the appropriate device control unit can be collected.

The second aspect according to the present invention has the following configuration.

First, an individual entry is provided for each device control unit in a processor device in a computer or in a process card. A hardware configuration information description table (hardware configuration information description table 411) is provided to store identification information indicating, for each entry, whether the device control unit corresponding to each entry is in the processor device unit in the computer or in the process card.

When an error occurs in a device control unit in a processor device in a computer or in a process card, an error message corresponding to the error is displayed.

When an error information collection command corresponding to the error message is issued, a hardware configuration information description table is referred to, thereby specifying the processor device in the computer or the process card which operates the device control unit in which an error has occurred, and collecting only the error information corresponding to the device control unit.

With the above described second aspect of the present invention, the operator only issues a simple error information collection command in response to an error message so that the hardware configuration information description table is referred to. As a result, the processor device in the computer or the process card which operates the device control unit in which an error has occurred, can be automatically specified, thereby obtaining only error information appropriately corresponding to the device control unit.

The third aspect of the present invention has the following configuration.

First, the processor device in the computer or the process card is provided with a control information management table (control information management table 111) similar to that in the first aspect of the present invention, and a hardware configuration information description table (hardware configuration information description table 701) similar to that in the second aspect of the present invention.

When an error occurs in the device control unit in the processor device in the computer or the process card, the occurrence is recorded in the control information management table.

Then, an error message corresponding to the error is displayed.

When an error information collection command is issued in response to the error message, the control information management table and the hardware configuration information description table are referred to, and the processor device in the computer or the process card which operates a device control unit in which an error has occurred, can be specified. Thus, only error information corresponding to the device control unit is collected.

With the configuration according to the above described third aspect of the present invention, error information can be collected at a greater precision.

The present invention can also be designed as a computer-readable storage device for directing a computer to perform the functions similar to those realized with the configuration according to the above described aspects of the present invention.

BRIEF DESCRIPTION OF THE DRAWINGS

Other objects and aspects of the present invention can be easily understood by one of ordinary skill in the art by referring to the preferred embodiments of the present invention and the attached drawings.

FIG. 2 shows the configuration of a control information management table;

FIG. 11 shows an example of an error message (3);

FIG. 12 shows an example of an error message (4); and

DESCRIPTION OF THE PREFERRED EMBODIMENTS

The preferred embodiments of the present invention are described below in detail by referring to the attached drawings.

First preferred embodiment according to the present invention

Figure 1:
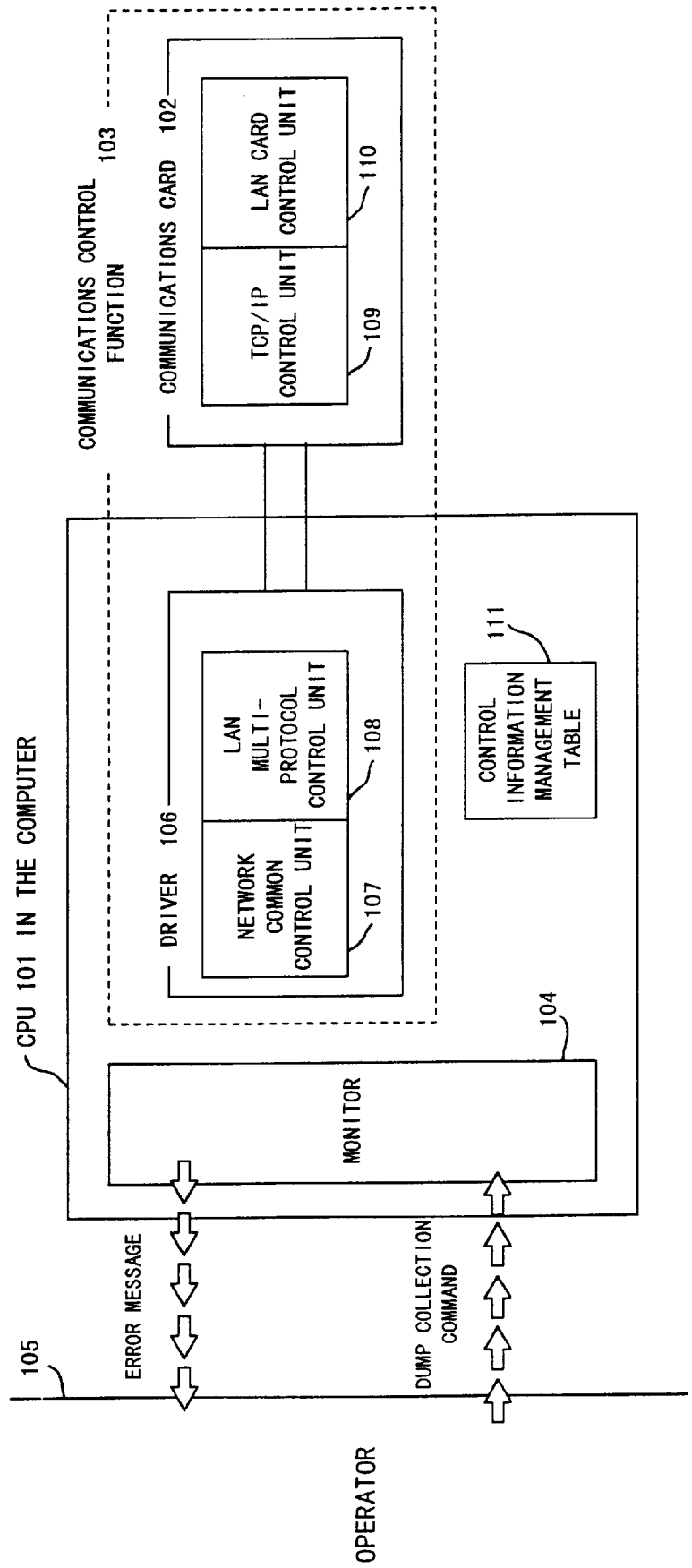
FIG. 1 shows the configuration according to the first embodiment of the present invention.

FIG. 1 shows the configuration according to the first preferred embodiment of the present invention.

The computer system according to the first preferred embodiment has a communications card 102, which is an intelligent LAN (Local Area Network) card, connected to a CPU 101 in the computer. An operator 105 receives an error message through a monitor 104 executed in the CPU 101 in the computer, and issues a dump collection command in response to the error message.

A communications control function 103 can be realized by each of the units functioning as a network common control unit 107 and a LAN multi-protocol control unit 108 forming a driver 106 operating in the CPU 101 in the computer, and each of the units functioning as a TCP/IP control unit 109 and a LAN card control unit 110 operating in the communications card 102.

The network common control unit 107 has the functions of interfacing with the monitor 104, processing the common functions, managing buffers, etc.

The LAN multi-protocol control unit 108 has the function of terminating various communications protocols, for example, a TCP/IP (Transfer Control Protocol/Internet Protocol), etc.

The TCP/IP control unit 109 has the function of controlling the entire TCP/IP communications between the LAN, not shown in FIG. 1, and the CPU 101 in the computer through the LAN card control unit 110.

The LAN card control unit 110 has the function of physically interfacing with a LAN, not shown in FIG. 1.

A control information management table 111 specifically relates to the present invention, and is stored in memory or a storage device, not shown in FIG. 1, in the CPU 101 in the computer. The control information management table 111 can also be stored in the memory or a storage device in the communications card 102. FIG. 2 shows the configuration of the data on the control information management table 111.

As shown in FIG. 2, the control information management table 111 comprises flag bits 7 and 6 for use in specifying whether an error (abnormality) has occurred in the driver 106 in the CPU 101 in the computer or in the communications card 102; and flag bits 3, 2, 1, and 0 for use in specifying the exact position where the error has occurred.

That is, when an error (abnormality) occurs in the driver 106 in the CPU 101 in the computer, the flag bit 7 is set. When an error occurs in the communications card 102, the flag bit 6 is set.

The flag bit 3 is set when an error occurs in the network common control unit 107 forming part of the driver 106 in the CPU 101 in the computer. The flag bit 2 is set when an error occurs in the LAN multi-protocol control unit 108 forming part of the driver 106 in the CPU 101 in the computer.

Furthermore, when an error occurs in the TCP/IP control unit 109 in the communications card 102, the flag bit 1 is set. When an error occurs in the LAN card control unit 110 in the communications card 102, the flag bit 0 is set.

Figure 3:
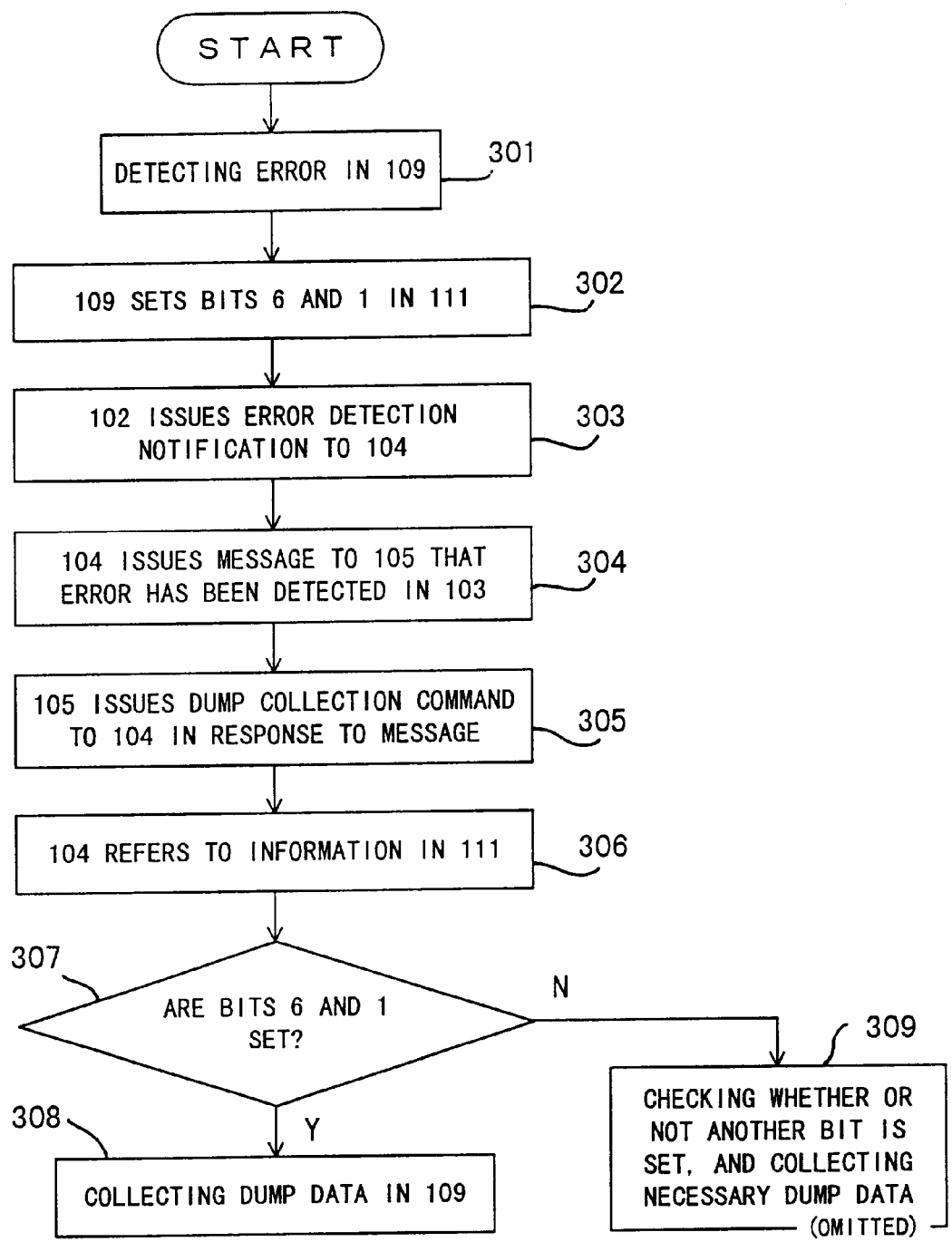
FIG. 3 is a flowchart showing the operations of the first embodiment of the present invention.

FIG. 3 is a flowchart showing the operations of the first preferred embodiment of the present invention executed when an error occurs in the TCP/IP control unit 109 in the communications card 102.

For example, an exception process routine is activated (step 301), when an error is detected by the TCP/IP control unit 109.

As a result, the TCP/IP control unit 109 sets the flag bits 6 and 1 in the control information management table 111 in the CPU 101 in the computer (step 302).

Then, the communications card 102 issues an error detection notification by the communications card 102 interrupting the monitor 104 in the CPU 101 in the computer (step 303).

The monitor 104 notifies the operator 105 through a message that an error has been detected in the communications control function 103 (step 304).

The operator 105 issues a dump collection command in response to the error message (step 305). This command does not have to be a complicated command that specifies the CPU 101 in the computer or the communications card 102 as in the conventional technology. The command has a simple syntax of specifying dump collection in response to a received error message. That is, when the dump collection command is issued, the operator 105 does not have to clearly specify the CPU 101 in the computer or the communications card 102 which executes firmware or a program in which an error has occurred.

Upon receipt of the above described dump collection command, the monitor 104 refers to the control information management table 111 (step 306), and determines whether or not the flag bits 6 and 1 are set in the table (step 307).

When the monitor 104 determines that the flag bits 6 and 1 are set in the control information management table 111, it issues to the communications card 102 a dump collection command specifying the TCP/IP control unit 109. As a result, dump information, which is an execution image of the TCP/IP control unit 109 in the memory space assigned to the communications card 102, is collected and stored in a file system (not shown in FIG. 1) in the CPU 101 in the computer as a dump file, etc. (steps 307 and 308).

When the monitor 104 determines that both the flag bits 6 and 1 in the control information management table 111 are not set, it then checks whether or not another flag bit is set in the control information management table 111, and the necessary dump data is collected depending on the check result (steps 307 and 309).

Figure 4:
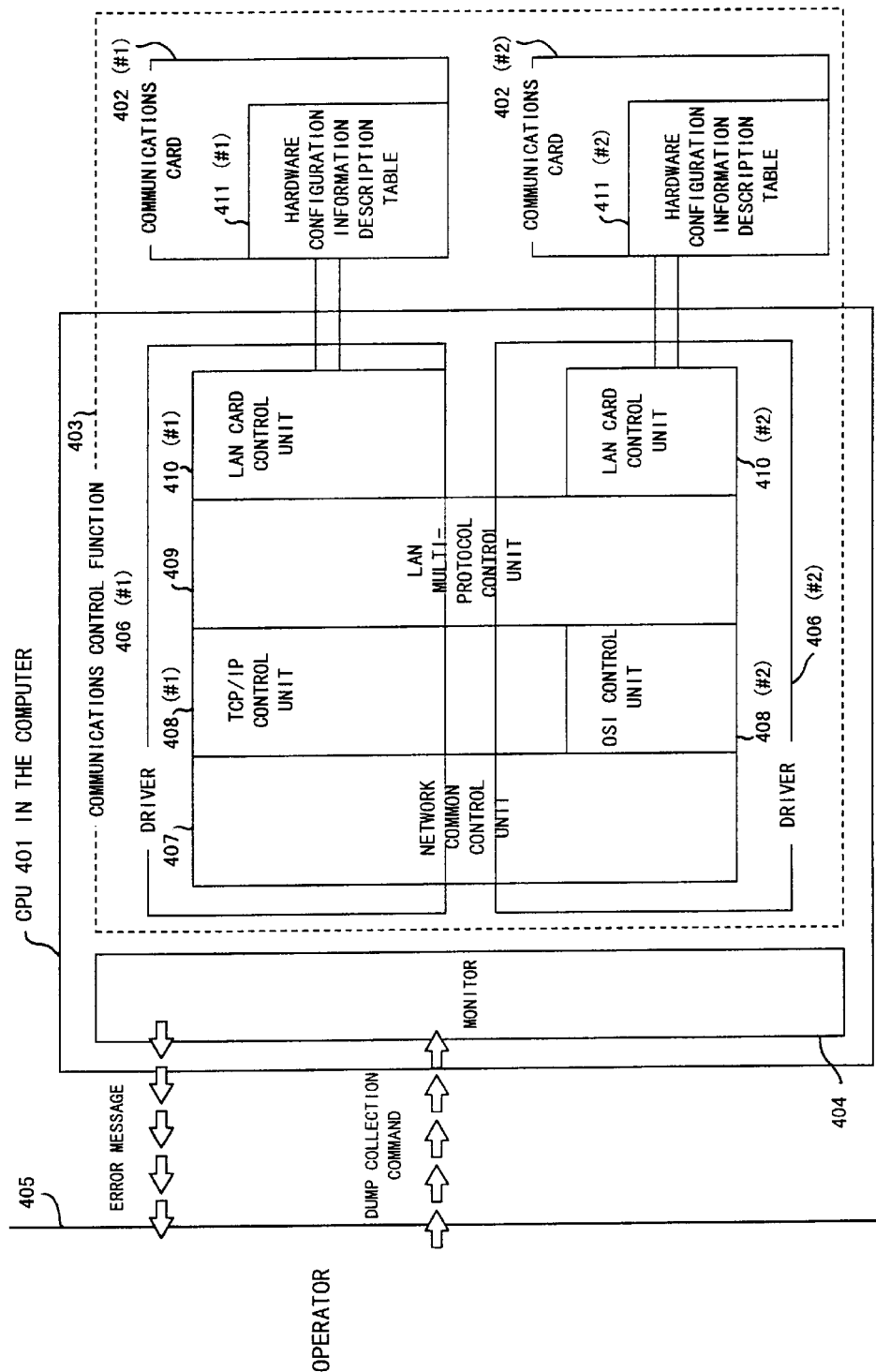
FIG. 4 shows the configuration according to the second preferred embodiment of the present invention.

As described above, according to the first preferred embodiment of the present invention, the operator 105 automatically specifies the CPU 101 in the computer or the communications card 102 which operates the control unit in which an error has occurred by referring to the control information management table 111 through the monitor 104 by only issuing a simple dump collection command in response to an error message, thereby collecting only dump information appropriately corresponding to the control unit.
Second preferred embodiment according to the present invention FIG. 4 shows the configuration of the second embodiment of the present invention.

The computer system according to the second preferred embodiment comprises a plurality of communications cards 402 (#1 and #2), which are non-intelligent LAN cards, connected to a CPU 401 in the computer. An operator 405 receives an error message through a monitor 404 operated in the CPU 401 in the computer, and issues a dump collection command in response to the error message.

In the CPU 401 in the computer, a driver 406 (#1) for controlling the communications card 402 (#1) and a driver 406 (#2) for controlling the communications card 402 (#2) are operated.

According to the second preferred embodiment, a network common control unit 407 having a function similar to that of the network common control unit 107 according to the first preferred embodiment of the present invention shown in FIG. 1, and a LAN multi-protocol control unit 409 having a function similar to that of the LAN multi-protocol control unit 108 shown in FIG. 1 are included in the drivers 406 (#1) and 406 (#2) in the CPU 401 in the computer.

Furthermore, according to the second preferred embodiment of the present invention, a TCP/IP control unit 408 (#1) having the function similar to that of the TCP/IP control unit 109 implemented in the communications card 102 according to the first embodiment of the present invention shown in FIG. 1, and a LAN card control unit 410 (#1) having the function similar to that of the LAN card control unit 110 implemented in the communications card 102 are included in the driver 406 (#1) corresponding to the communications card 402 (#1) in the CPU 401 in the computer.

Furthermore, according to the second preferred embodiment of the present invention, an OSI control unit 408 (#2) and the LAN card control unit 410 (#1) are included in the driver 406 (#2) corresponding to the communications card 402 (#2) in the CPU 401 in the computer.

The OSI control unit 408 (#2) has the function of controlling the entire OSI communications between the LAN, not shown in FIG. 4, and the CPU 401 in the computer through the LAN card control unit 410 (#2).

The two drivers 406 (#1 and #2) in the CPU 401 in the computer having the above described configuration and the two communications cards 402 (#1 and #2) realize a communications control function 403.

According to the second preferred embodiment of the present invention, hardware configuration information description tables 411 (#1) and 411 (#2) are stored in the memory in the communications cards 402 (#1) and 402 (#2) or the storage device as the functions specifically relating to the present invention. The hardware configuration information description table 411 (#1 and #2) can also be stored in the memory in the CPU 401 in the computer or the storage device.

Figure 5:
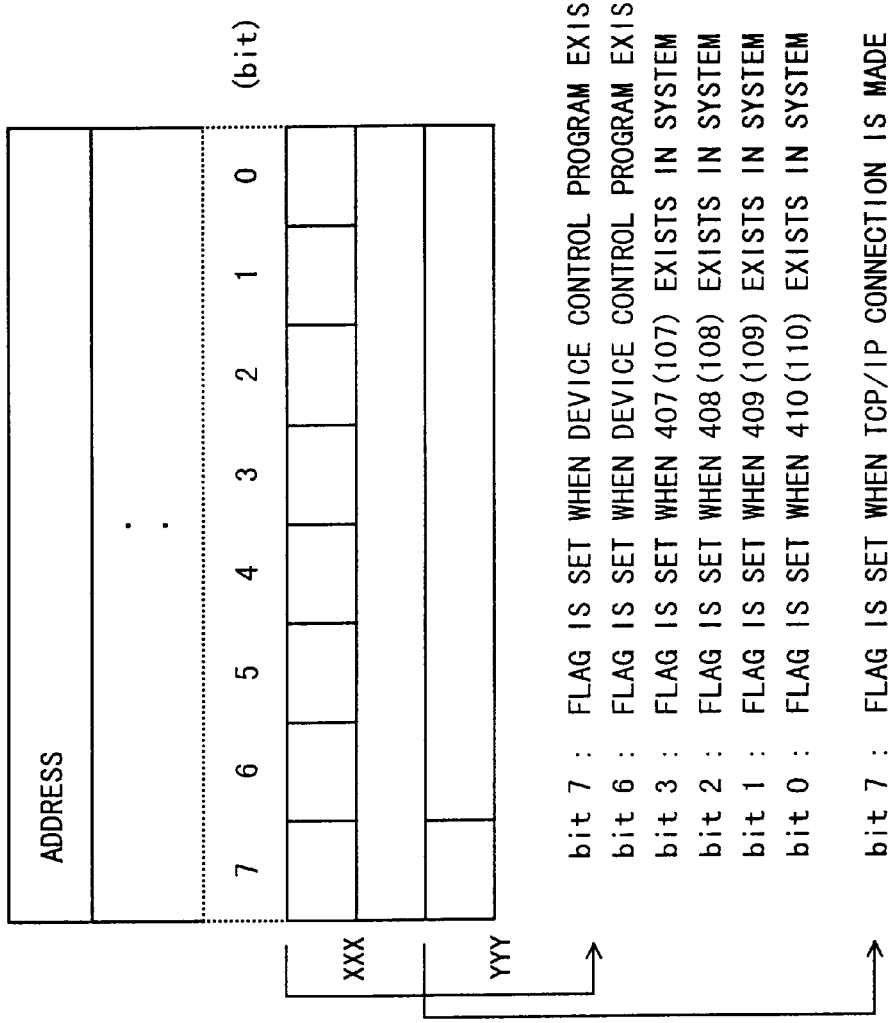
FIG. 5 shows the configuration of the hardware configuration information description table.

FIG. 5 shows the configuration of the data in the hardware configuration information description table 411.

This hardware configuration information description table 411 has individual entries XXX, YYY, . . . for each of the control units possibly implemented in the communications card 402 such as the TCP/IP control unit 408 (#1), the OSI control unit 408 (#2), the LAN card control unit 410 (#1), the LAN card control unit 410 (#2). For each entry, the hardware configuration information description table 411 has flag bits 7 and 6 indicating whether a control unit (device control program) corresponding to the entry exists in the CPU 401 in the computer or in the communications card 402; and flag bits 3, 2, 1, and 0 indicating whether or not each control unit exists in the system (the CPU 401 in the computer or the communications card 402).

That is, for each entry, the flag bit 7 is set when the control unit (device control program) corresponding to the entry exists in the CPU 401 in the computer, and the flag bit 6 is set when it exists in the communications card 402.

For each entry, the flag bit 3 is set when the network common control unit 407 exists in the system, the flag bit 2 is set when either the TCP/IP control unit 408 (#1) corresponding to the entry or the OSI control unit 408 (#2) exists, the flag bit 1 is set when the LAN multi-protocol control unit 409 exists in the system, and the flag bit 0 is set when either the LAN card control unit 410 (#1) corresponding to the entry or 410 (#2) exists in the system.

Figure 6:
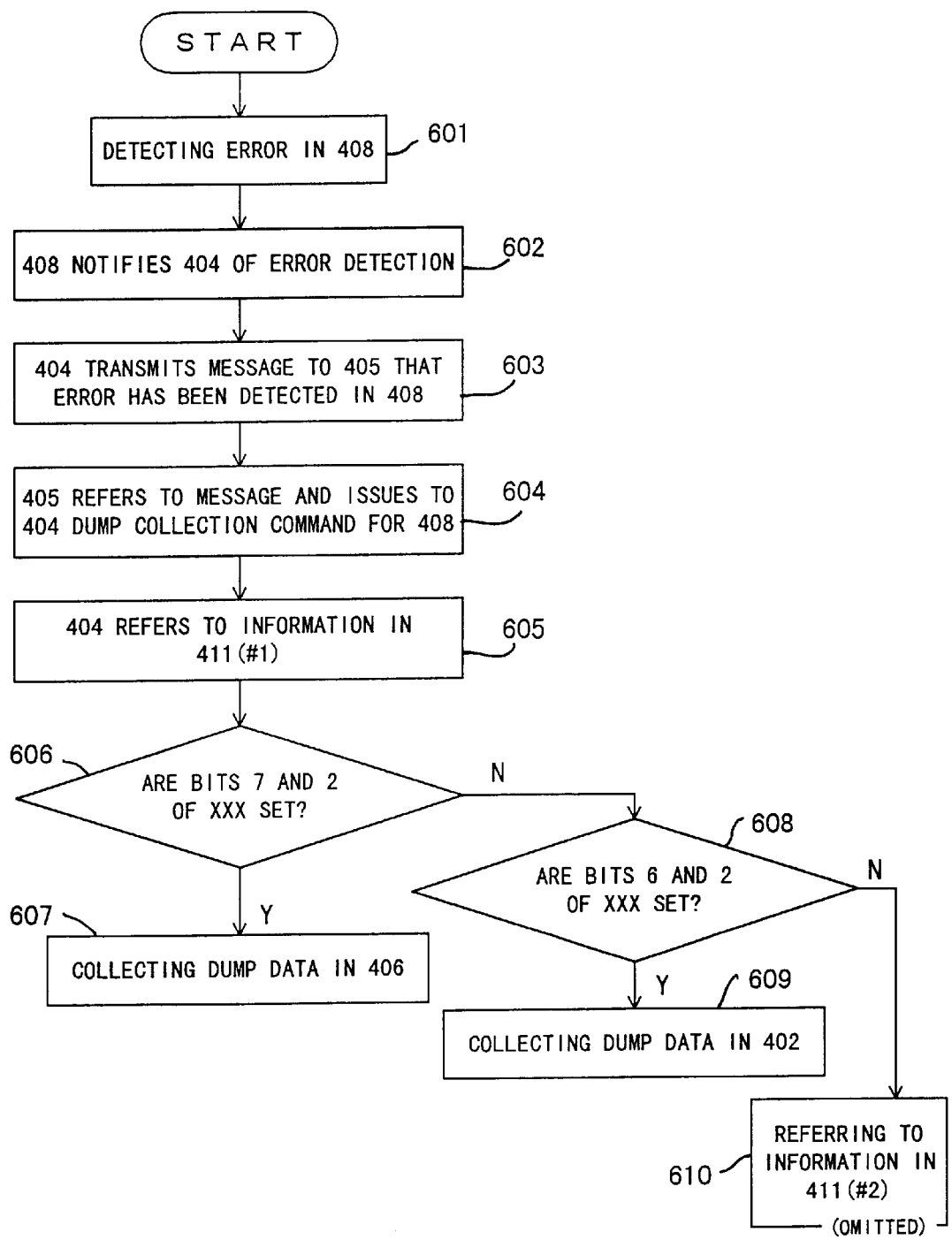
FIG. 6 is a flowchart showing the operations according to the second embodiment of the present invention.

FIG. 6 is a flowchart showing the operations according to the second preferred embodiment of the present invention performed when an error occurs, for example, in the TCP/IP control unit 408 (#1) or the OSI control unit 408 (#2).

First, if an error is detected in the TCP/IP control unit 408 (#1) or the OSI control unit 408 (#2), then, for example, an exception process routine is activated (step 601).

As a result, the TCP/IP control unit 408 (#1) or the OSI control unit 408 (#2) interrupts the monitor 404 in the CPU 401 in the computer to issue an error detection notification (step 602).

The monitor 404 notifies the operator 405 as an error message that an error has been detected in the TCP/IP control unit 408 (#1) or the OSI control unit 408 (#2) (step 603).

The operator 405 issues a dump collection command of the TCP/IP control unit 408 (#1) or the OSI control unit 408 (#2) to the monitor 404 by referring to the error message (step 604). Up to this point, the monitor 404 does not know whether the TCP/IP control unit 408 (#1) or the OSI control unit 408 (#2) exists at the driver 406 in the CPU 401 in the computer. This command does not have to be a complicated command as in the conventional technology. The command has a simple syntax of specifying the control unit indicating dump collection in response to a received error message. That is, when the dump collection command is issued, the operator 405 does not have to clearly specify the CPU 401 in the computer or the communications card 402 which executes firmware or a program in which an error has occurred.

Upon receipt of the above described dump collection command, the monitor 404 first refers to the hardware configuration information description table 411 (#1) in the communications card 402 (#1) (step 605).

Then, it is determined whether or not the flag bits 7 and 2 for the entry XXX corresponding to the TCP/IP control unit 408 (#1) are set (step 606).

If the monitor 404 determines that the flag bits 7 and 2 in the hardware configuration information description table 411 (#1) are set, it can be recognized that the error has been detected in the TCP/IP control unit 408 (#1) forming part of the driver 406 (#1) in the CPU 401 in the computer. Therefore, it issues a dump collection command specifying the TCP/IP control unit 408 (#1) forming part of the driver 406 (#1) in the CPU 401 in the computer. As a result, dump information, which is an executable image of the TCP/IP control unit 408 (#1) in the memory space assigned to the driver 406 in the CPU 401 in the computer, is collected and stored as a dump file, etc. in the file system (not shown in FIG. 4) in the CPU 401 in the computer (steps 606 and 607).

The monitor 404 determines whether or not the flag bits 6 and 2 for the entry XXX corresponding to the TCP/IP control unit 408 (#1) are set in the hardware configuration information description table 411 (#1) when it is determined both the flag bits 7 and 2 are not set in the hardware configuration information description table 411 (#1) (step 608).

When the monitor 404 determines that the flag bits 6 and 2 are set in the hardware configuration information description table 411 (#1), it can be recognized that the error has been detected in the TCP/IP control unit 408 (#1) operated in the communications card 402 (#1) unlike the case shown in FIG. 4. Therefore, it issues a dump collection command specifying the TCP/IP control unit 408 (#1) in the communications card 402 (#1). As a result, dump information, which is an executable image of the TCP/IP control unit 408 (#1) in the memory space assigned to the communications card 402 (#1), is collected and stored as a dump file, etc. in the file system (not shown in FIG. 4) in the CPU 401 in the computer (steps 608 and 609).

When the monitor 404 determines that none of the flag bits 6 and 2 are set in the hardware configuration information description table 411 (#1), it can be recognized that the error has been detected in the OSI control unit 408 (#2), not in the TCP/IP control unit 408 (#1). Therefore, the control processes described above, steps 606 through 609, are performed by referring to the hardware configuration information description table 411 (#2) in the communications card 402 (#2), thereby collecting the corresponding dump information (step 610).

As described above, according to the second preferred embodiment of the present invention, the operator 405 automatically specifies the CPU 401 in the computer or the communications card 402 (#1 and #2) which operates the control unit in which an error has occurred by referring to the control information management table 411 (#1 and #2) through the monitor 404 by only issuing a simple dump collection command by referring to an error message, thereby collecting only dump information appropriately corresponding to the control unit.

Third preferred embodiment according to the present invention

Figure 7:
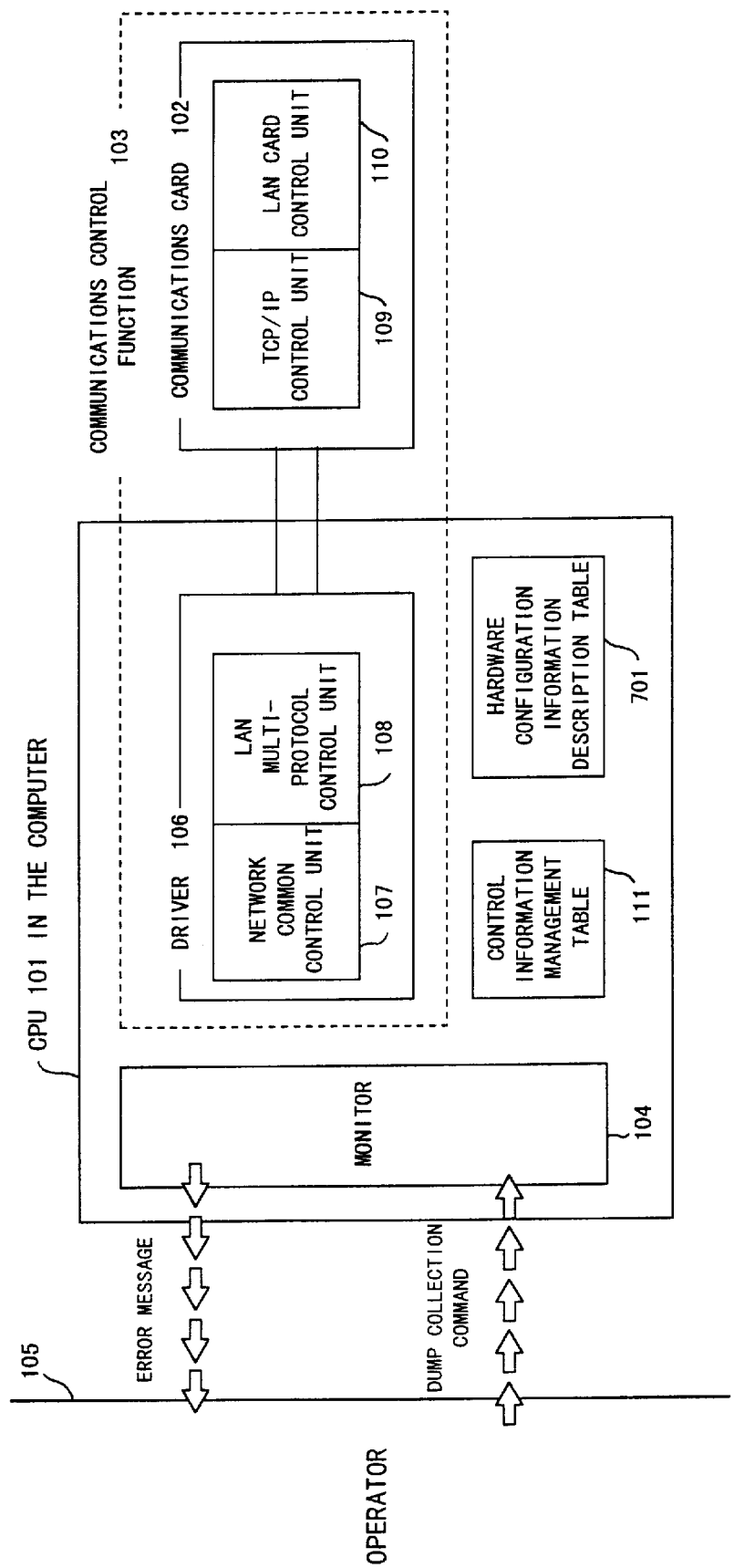
FIG. 7 shows the configuration according to the third embodiment of the present invention.

FIG. 7 shows the configuration according to the third preferred embodiment of the present invention.

The configuration according to the third preferred embodiment of the present invention shown in FIG. 7 is basically the same as the configuration according to the first preferred embodiment of the present invention shown in FIG. 1, but is different from it in that the CPU 101 in the computer contains a hardware configuration information description table 701 in addition to the control information management table 111.

The control information management table 111 shown in FIG. 7 has the configuration similar to that according to the first preferred embodiment of the present invention, as shown in FIG. 2. The hardware configuration information description table 701 has the configuration similar to that according to the second preferred embodiment of the present invention, as shown in FIG. 5.

In this case, the flag bit 7 is set when the control unit (device control program) corresponding to each entry exists in the CPU 101 in the computer. When it exists in the communications card 102, the flag bit 6 is set.

For each entry, the flag bit 3 is set when the network common control unit 107 exists in the system, the flag bit 2 is set when the LAN multi-protocol control unit 108 exists in the system, the flag bit 1 is set when the TCP/IP control unit 109 exists in the system, and the flag bit 0 is set when the LAN card control unit 110 exists in the system.

The control information management table 111 and the hardware configuration information description table 701 can be stored in the memory in the communications card 102 or the storage device.

According to the third preferred embodiment of the present invention, the feature of the present invention is that a control unit in which an error has occurred can be specified using the contents of the control information management table 111 and the hardware configuration information description table 701, and the appropriate dump information can be collected.

Figure 8:
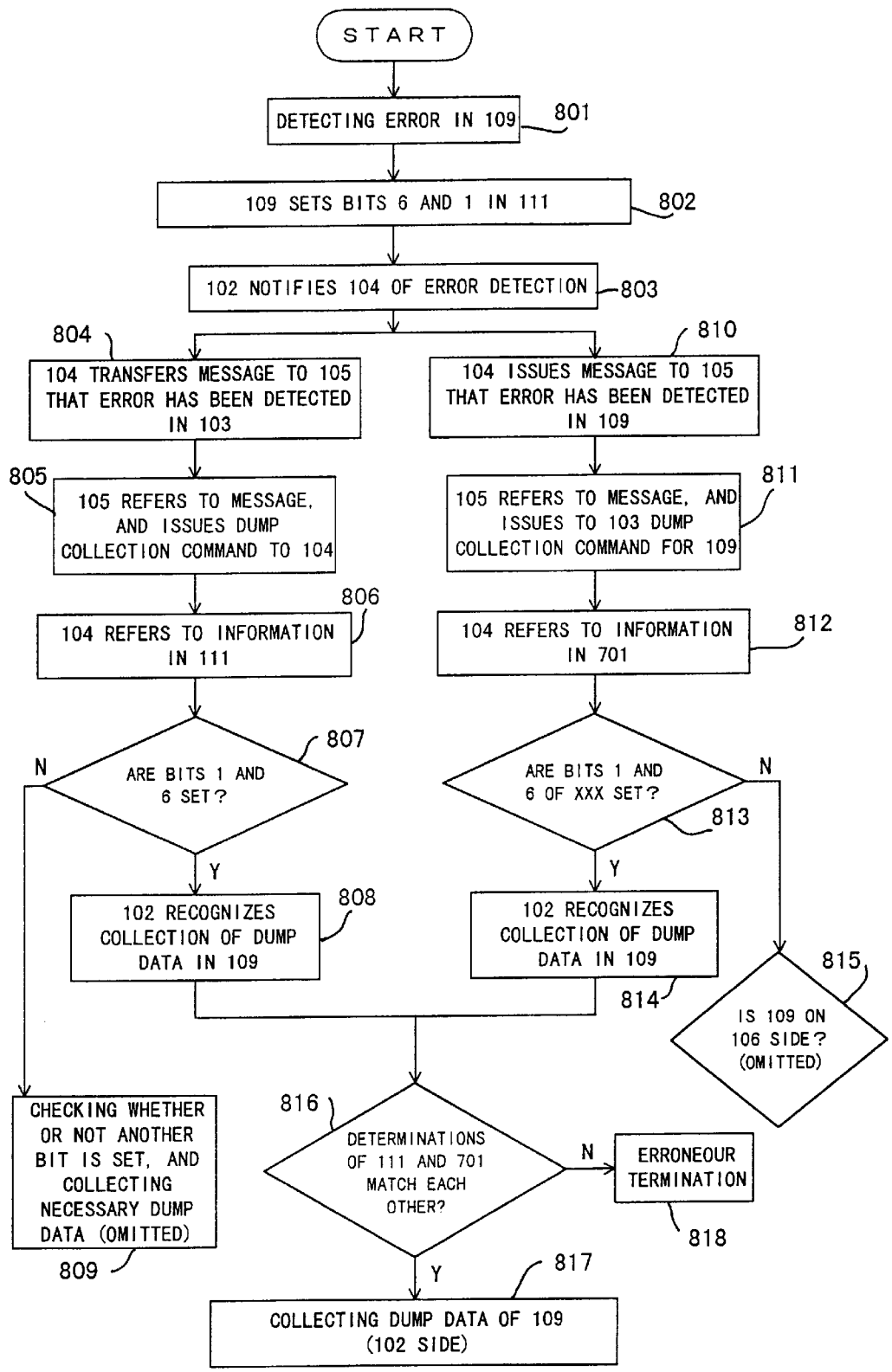
FIG. 8 is a flowchart showing the operations according to the third embodiment of the present invention.
Figure 9:
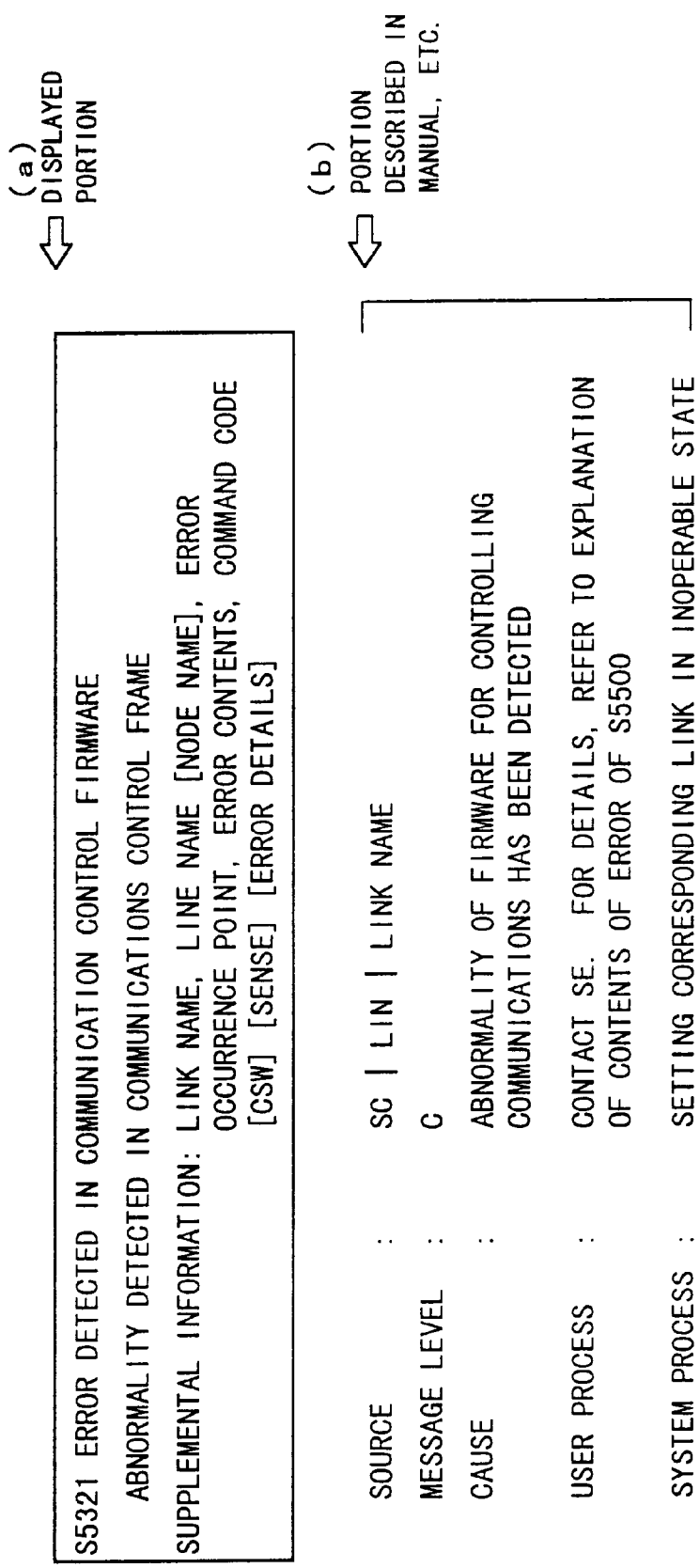
FIG. 9 shows an example of an error message (1)
Figure 10:
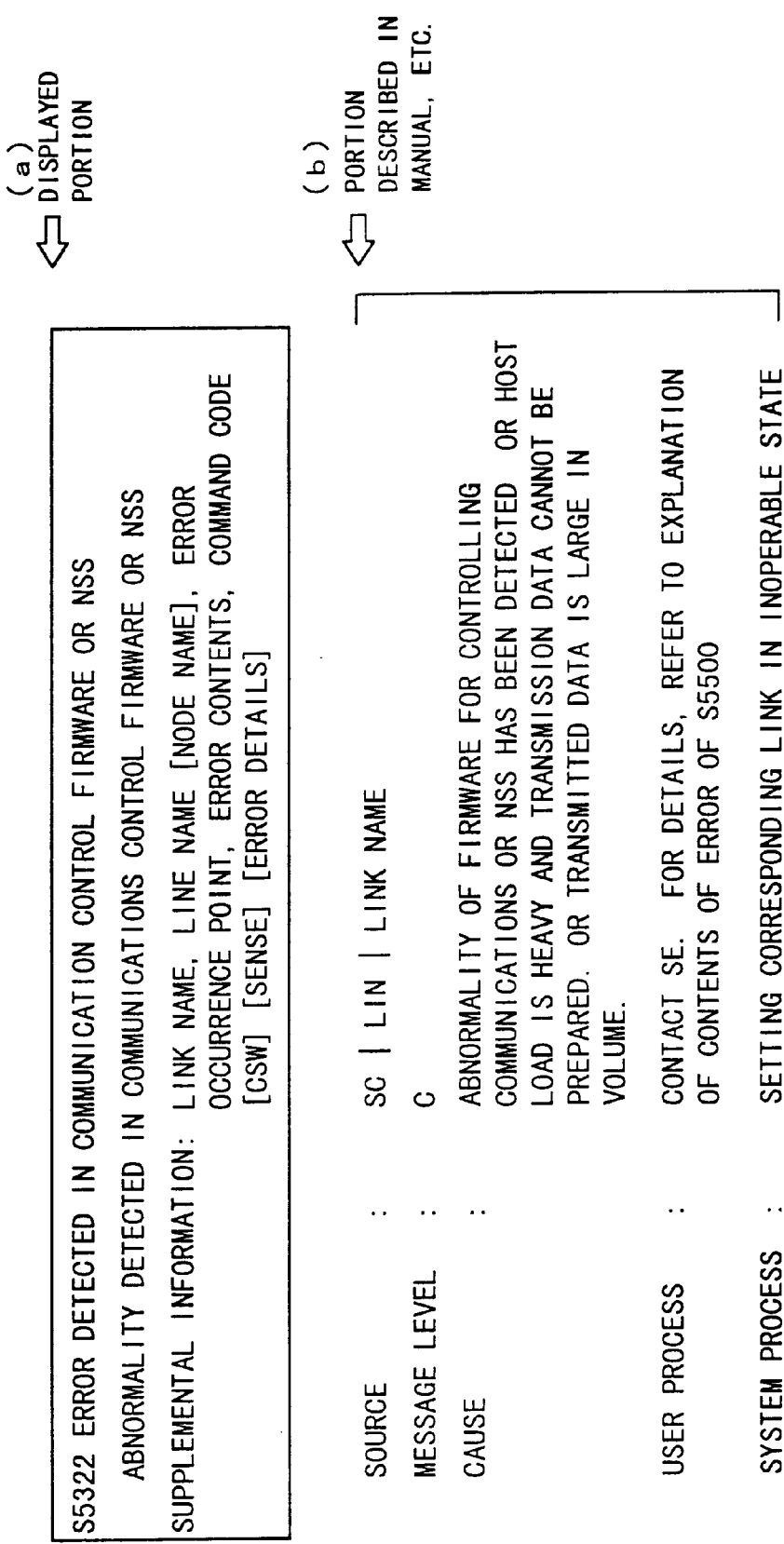
FIG. 10 shows an example of an error message (2)

FIG. 8 is a flowchart showing the operations according to the third preferred embodiment of the present invention executed when an error occurs, for example, in the TCP/IP control unit 109 in the communications card 102.

First, if the TCP/IP control unit 109 has detected an error, for example, an exception process routine is activated (step 801).

As a result, the TCP/IP control unit 109 sets the flag bits 6 and 1 in the control information management table 111 in the CPU 101 in the computer (step 802).

Then, the communications card 102 interrupts the monitor 104 in the CPU 101 in the computer to issue an error detection notification (step 803).

The monitor 104 notifies the operator 105 as an error message that an error has been detected in the communications control function 103 (step 804).

In response to the error message, the operator 105 issues a dump collection command (step 805). This command has a simple syntax indicating only dump data collection in response to a received error message as in the case according to the first preferred embodiment of the present invention.

Upon receipt of the above described dump collection command, the monitor 104 refers to the control information management table 111 (step 806), and determines whether or not the flag bits 6 and 1 are set in the table (step 807).

When the monitor 104 determines that the flag bits 6 and 1 are set in the control information management table 111, it is recognized that dump data should be collected with the TCP/IP control unit 109 specified through the communications card 102 (steps 807 and 808).

When the monitor 104 determines that none of the flag bits 6 and 1 are set in the control information management table 111, it is checked whether or not another flag bit is set in the control information management table 111, and necessary dump data is collected depending on the check result (steps 807 and 809).

After the control processes in the above described steps 804 through 809, the monitor 104 performs the control processes in steps 810 through 815.

That is, the monitor 104 notifies the operator 105 as an error message that the TCP/IP control unit 109 has detected an error (step 810).

The operator 105 refers to the error message, and issues to the monitor 104 a dump collection command for the TCP/IP control unit 109 (step 811). Up to this point, the monitor 104 does not know that the TCP/IP control unit 109 exists in the communications card 102. The command has a simple syntax indicating dump collection of the control unit displayed in the received error message specified, as in the case according to the second preferred embodiment of the present invention.

Upon receipt of the above described dump collection command, the monitor 104 refers to the hardware configuration information description table 701 (step 812).

Then, it is determined whether or not the flag bits 6 and 1 for the entry XXX corresponding to the TCP/IP control unit 109 are set (step 813).

If the monitor 104 determines that the flag bits 6 and 1 are set in the hardware configuration information description table 701, then it will recognize that the error occurred in the TCP/IP control unit 109 in the communications card 102. Therefore, dump data specifying the TCP/IP control unit 109 in the communications card 102 should be collected (steps 813 and 814).

When the monitor 104 determines that none of the flag bits 6 and 1 are set in the hardware configuration information description table 701, it is determined whether or not the flag bits 7 and 1 for the entry XXX corresponding to the TCP/IP control unit 109 are set, that is, whether or not the TCP/IP control unit 109 exists in the CPU 101 in the computer (step 815).

After obtaining the recognition results of the steps 808 and 814, the monitor 104 determines whether or not the recognition results match each other (step 816).

When the monitor 104 determines that the recognition results of steps 808 and 814 match each other, it collects dump information which is an executable image of the TCP/IP control unit 109 in the memory space assigned to the communications card 102, and stores the information as a dump file, etc. in the file system (not shown in FIG. 1) in the CPU 101 in the computer (steps 816 and 817).

When the monitor 104 determines that the recognition results of steps 808 and 814 do not match each other, it determines that an abnormality exists and terminates the process as an error (steps 816 and 818).

As described above, dump data can be collected at a higher probability according to the third preferred embodiment of the present invention.

Examples of error messages

FIGS. 9 through 12 show examples ((a) in each figure) of error messages displayed to the operators 105 (FIGS. 1 and 7) and 405 (FIG. 4), and show respective descriptions ((b) in each figure) of manuals, etc.

Supplement to storage medium for storing the program for realizing each preferred embodiment The present invention can be realized as a computer-readable storage medium used to direct a computer to perform the functions similar to those realized by each configuration according to the above described preferred embodiments of the present invention.

Figure 13:
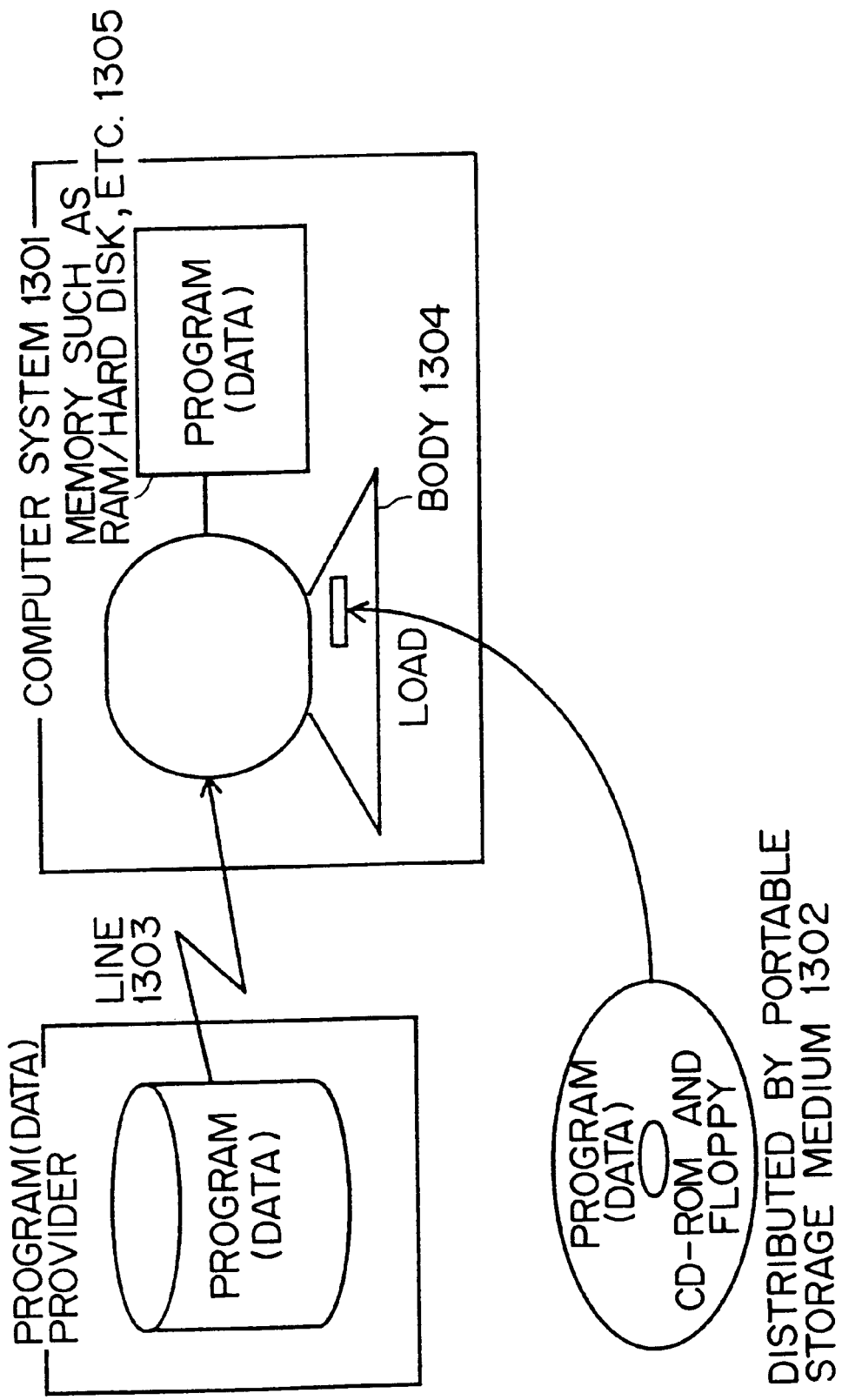
FIG. 13 shows the storage medium which stores a program for realizing each preferred embodiment of the present invention.

In this case, for example, a portable storage medium 1302 such as a floppy disk, a CD-ROM disk, an optical disk, a removable hard disk, etc., and a program for realizing each function according to the preferred embodiment of the present invention through a network line 1303 are loaded into memory (RAM, a hard disk, etc.) in a body 1304 of a computer 1301 for execution as shown in FIG. 13.

What is claimed is:

1. A method for collecting error information when an error occurs in a computer system having a processor device in a computer or a process card, comprising the steps of:

providing a control information management table for storing, in the processor device in the computer or the process card, information as to whether the error has occurred in a device control unit in the processor device in the computer or in a device control unit in the process card;

recording an occurrence of an error in the control information management table when the error has occurred in the device control unit in the processor device in the computer or the process card;

displaying an error message corresponding to the error; and specifying the processor device in the computer or the process card which operates the device control unit in which the error has occurred, by referring to the control information management table when an error information collection command is issued in response to the error message, and collecting only error information about the device control unit.

2. The method according to claim 1, wherein said process card is at least one intelligent card, at least one non-intelligent card, or a combination of at least one intelligent card and non-intelligent card.

3. The method according to claim 1, wherein said error information collection command is a memory dump command; and said error information is collected as data collection in a memory area corresponding to the device control unit.

4. The method according to claim 1, wherein said device control unit causes said error in a firmware or a program provided therein.

5. A method for collecting error information when an error occurs in a computer system having a processor device in a computer or a process card, comprising the steps of:

having, in the processor device in the computer or the process card, an entry for each device control unit in the processor device in the computer or the process card, and providing for each entry a hardware configuration information description table for storing identification information indicating whether a device control unit corresponding to the entry exists in the processor device in the computer or in the process card;

displaying an error message corresponding an error when the error has occurred in a device control unit in the processor device in the computer or the process card; and specifying the processor device in the computer or the process card which operates the device control unit in which the error has occurred, by referring to the hardware configuration information description table when an error information collection command is issued in response to the error message, and collecting only error information about the device control unit.

6. The method according to claim 5, wherein said process card is at least one intelligent card, at least one non-intelligent card, or a combination of at least one intelligent card and non-intelligent card.

7. The method according to claim 5, wherein said error information collection command is a memory dump command; and said error information is collected as data collection in a memory area corresponding to the device control unit.

8. A method for collecting error information when an error occurs in a computer system having a processor device in a computer or a process card, comprising the steps of:

providing a control information management table for storing, in the processor device in the computer or the process card, information as to whether the error has occurred in a device control unit in the processor device in the computer or in a device control unit in the process card;

having, in the processor device in the computer or the process card, an entry for each of the device control units, and providing for each entry a hardware configuration information description table for storing identification information indicating whether a device control unit corresponding to the entry exists in the processor device in the computer or in the process card;

recording an occurrence of an error in the control information management table when the error has occurred in the device control unit in the processor device in the computer or the process card;

displaying an error message corresponding to the error; and specifying the processor device in the computer or the process card which operates the device control unit in which the error has occurred, by referring to the control information management table and the hardware configuration information description table when an error information collection command is issued in response to the error message, and collecting only error information about the device control unit.

9. The method according to claim 8, wherein said process card is at least one intelligent card, at least one non-intelligent card, or a combination of at least one intelligent card and non-intelligent card.

10. The method according to claim 8, wherein said error information collection command is a memory dump command; and said error information is collected as data collection in a memory area corresponding to the device control unit.

11. An apparatus for collecting error information when an error occurs in a computer system having a processor device in a computer or a process card, comprising:

a control information management table for storing, in the processor device in the computer or the process card, information as to whether the error has occurred in a device control unit in the processor device in the computer or in a device control unit in the process card;

an error record module for recording an occurrence of an error in the control information management table when the error has occurred in the device control unit in the processor device in the computer or the process card;

error message display module for displaying an error message corresponding to the error; and error information collection module for specifying the processor device in the computer or the process card which operates the device control unit in which the error has occurred, by referring to the control information management table when an error information collection command is issued in response to the error message, and for collecting only error information about the device control unit.

12. The apparatus according to claim 11, wherein said process card is at least one intelligent card, at least one non-intelligent card, or a combination of at least one intelligent card and non-intelligent card.

13. The apparatus according to claim 11, wherein said error information collection command is a memory dump command; and said error information collection module collects data in a memory area corresponding to the device control unit.

14. An apparatus for collecting error information when an error occurs in a computer system having a processor device in a computer or a process card, comprising:

a hardware configuration information description table, provided in the processor device in the computer or the process card, for having an entry for each device control unit in the processor device in the computer or the process card, and providing for each entry, and for storing identification information indicating whether a device control unit corresponding to the entry exists in the processor device in the computer or in the process card;

an error message display module for displaying an error message corresponding an error when the error has occurred in a device control unit in the processor device in the computer or the process card; and an error information collection module for specifying the processor device in the computer or the process card which operates the device control unit in which the error has occurred, by referring to the hardware configuration information description table when an error information collection command is issued in response to the error message, and collecting only error information about the device control unit.

15. The apparatus according to claim 14, wherein said process card is at least one intelligent card, at least one non-intelligent card, or a combination of at least one intelligent card and non-intelligent card.

16. The apparatus according to claim 14, wherein said error information collection command is a memory dump command; and said error information collection module collects data in a memory area corresponding to the device control unit.

17. An apparatus for collecting error information when an error occurs in a computer system having a processor device in a computer or a process card, comprising:

a control information management table, provided in the processor device in the computer or the process card, for storing information as to whether the error has occurred in a device control unit in the processor device in the computer or in a device control unit in the process card;

a hardware configuration information description table, provided in the processor device in the computer or the process card, for having an entry for each of the device control units, and storing, for each entry, identification information indicating whether a device control unit corresponding to the entry exists in the processor device in the computer or in the process card;

an error record module for recording an occurrence of an error in the control information management table when the error has occurred in the device control unit in the processor device in the computer or the process card;

an error message display module for displaying an error message corresponding to the error; and an error information collection module for specifying the processor device in the computer or the process card which operates the device control unit in which the error has occurred, by referring to the control information management table and the hardware configuration information description table when an error information collection command is issued in response to the error message, and for collecting only error information about the device control unit.

18. The method according to claim 17, wherein said process card is at least one intelligent card, at least one non-intelligent card, or a combination of at least one intelligent card and non-intelligent card.

19. The device according to claim 17, wherein said error information collection command is a memory dump command; and said error information collection module collects data in a memory area corresponding to the device control unit.

20. A computer-readable storage medium used in a computer system having a processor device in a computer or a process card to direct said computer system to perform the functions of:

providing a control information management table for storing, in the processor device in the computer or the process card, information as to whether the error has occurred in a device control unit in the processor device in the computer or in a device control unit in the process card;

recording an occurrence of an error in the control information management table when the error has occurred in the device control unit in the processor device in the computer or the process card;

displaying an error message corresponding to the error; and specifying the processor device in the computer or the process card which operates the device control unit in which the error has occurred, by referring to the control information management table when an error information collection command is issued in response to the error message, and collecting only error information about the device control unit.

21. A computer-readable storage medium used in a computer system having a processor device in a computer or a process card to direct said computer system to perform the functions of:

having, in the processor device in the computer or the process card, an entry for each device control unit in the processor device in the computer or the process card, and providing for each entry a hardware configuration information description table for storing identification information indicating whether a device control unit corresponding to the entry exists in the processor device in the computer or in the process card;

displaying an error message corresponding an error when the error has occurred in a device control unit in the processor device in the computer or the process card; and specifying the processor device in the computer or the process card which operates the device control unit in which the error has occurred, by referring to the hardware configuration information description table when an error information collection command is issued in response to the error message, and collecting only error information about the device control unit.

22. A computer-readable storage medium used in a computer system having a processor device in a computer or a process card to direct said computer system to perform the functions of:

providing a control information management table for storing, in the processor device in the computer or the process card, information as to whether the error has occurred in a device control unit in the processor device in the computer or in a device control unit in the process card;

having, in the processor device in the computer or the process card, an entry for each of the device control units, and providing for each entry a hardware configuration information description table for storing identification information indicating whether a device control unit corresponding to the entry exists in the processor device in the computer or in the process card;

recording an occurrence of an error in the control information management table when the error has occurred in the device control unit in the processor device in the computer or the process card;

displaying an error message corresponding to the error; and specifying the processor device in the computer or the process card which operates the device control unit in which the error has occurred, by referring to the control information management table and the hardware configuration information description table when an error information collection command is issued in response to the error message, and collecting only error information about the device control unit.

* * * * *